March 6, 1945.  J. B. ARMITAGE ET AL  2,370,764
MACHINE TOOL
Filed May 23, 1942   8 Sheets-Sheet 2

INVENTORS:
JOSEPH B. ARMITAGE &
ORRIN W. BARKER.
BY: W.O. O'Connor
ATTORNEY.

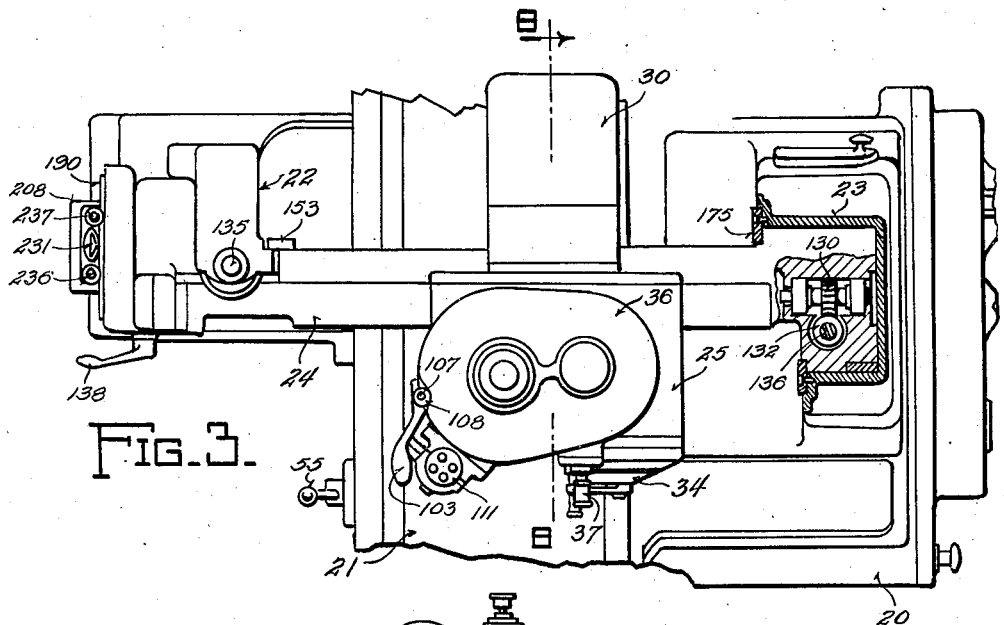
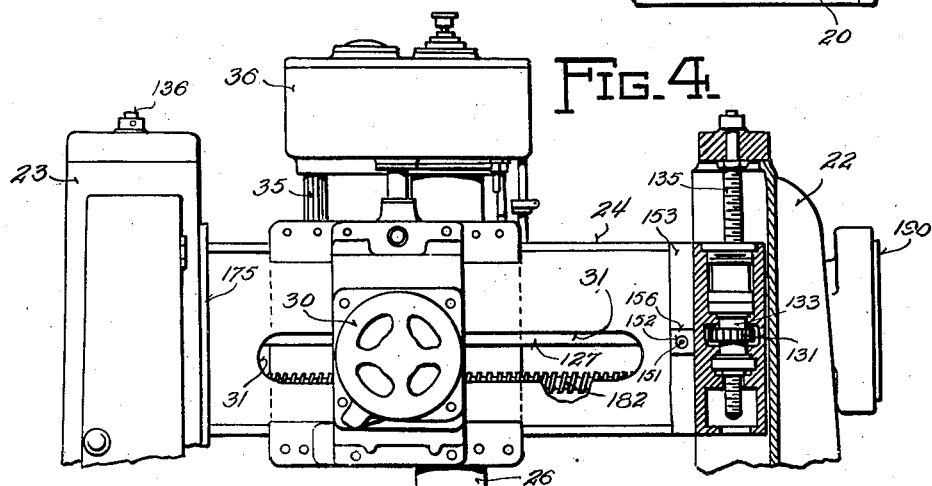
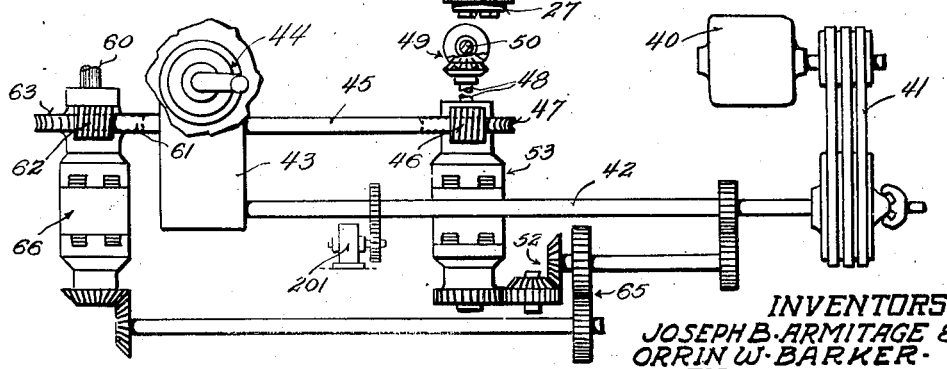

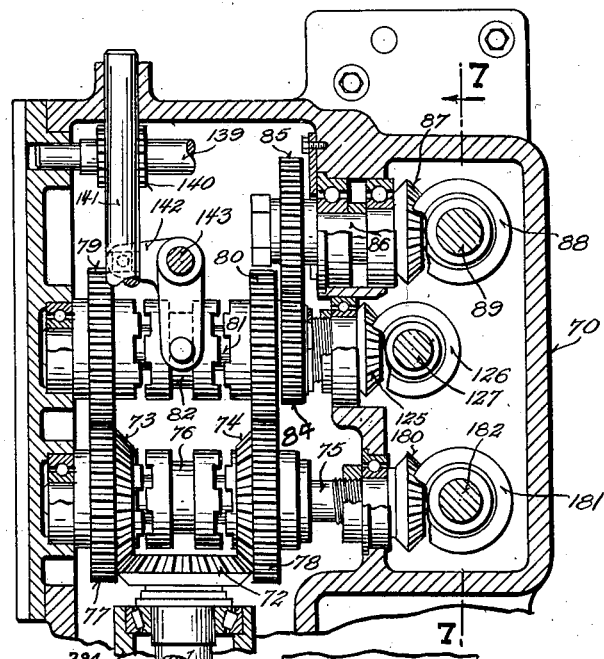

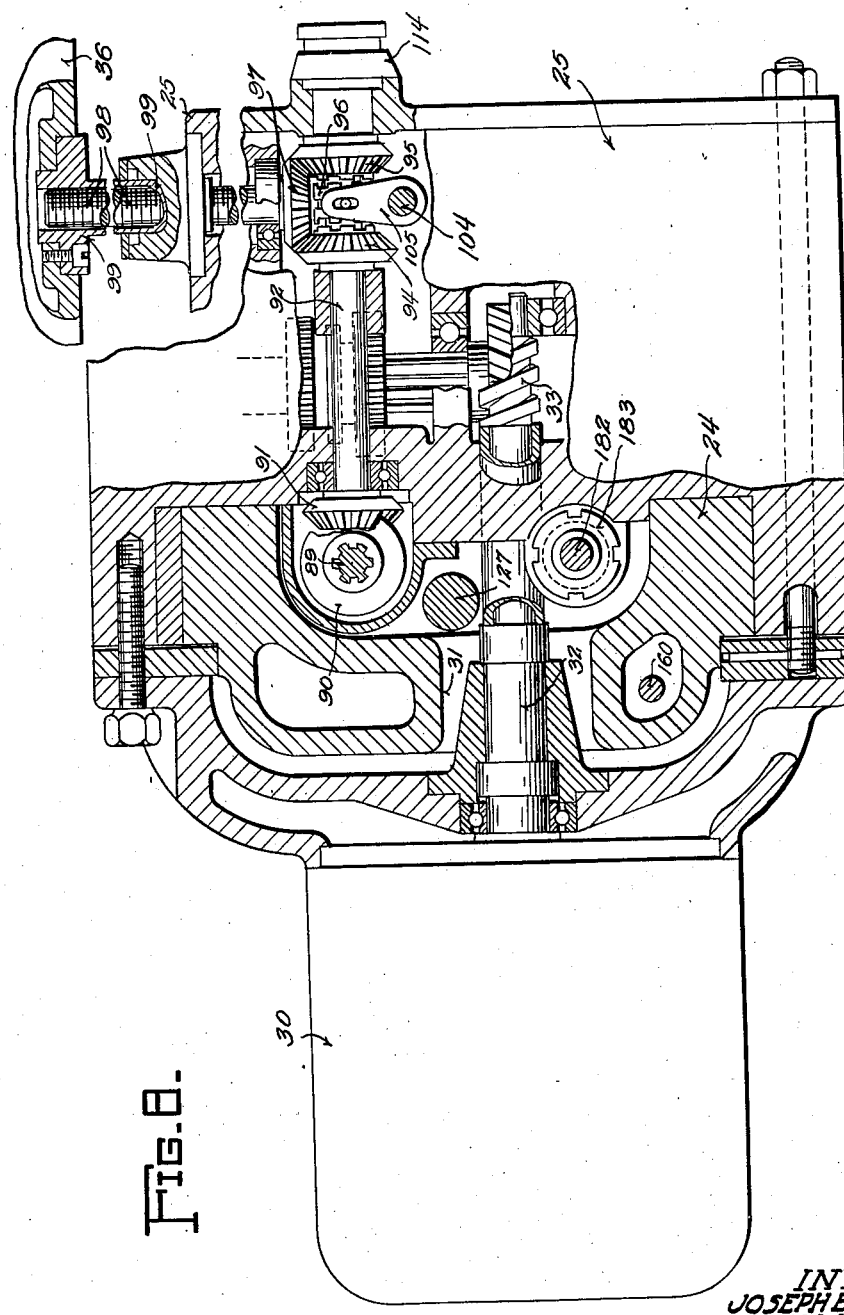

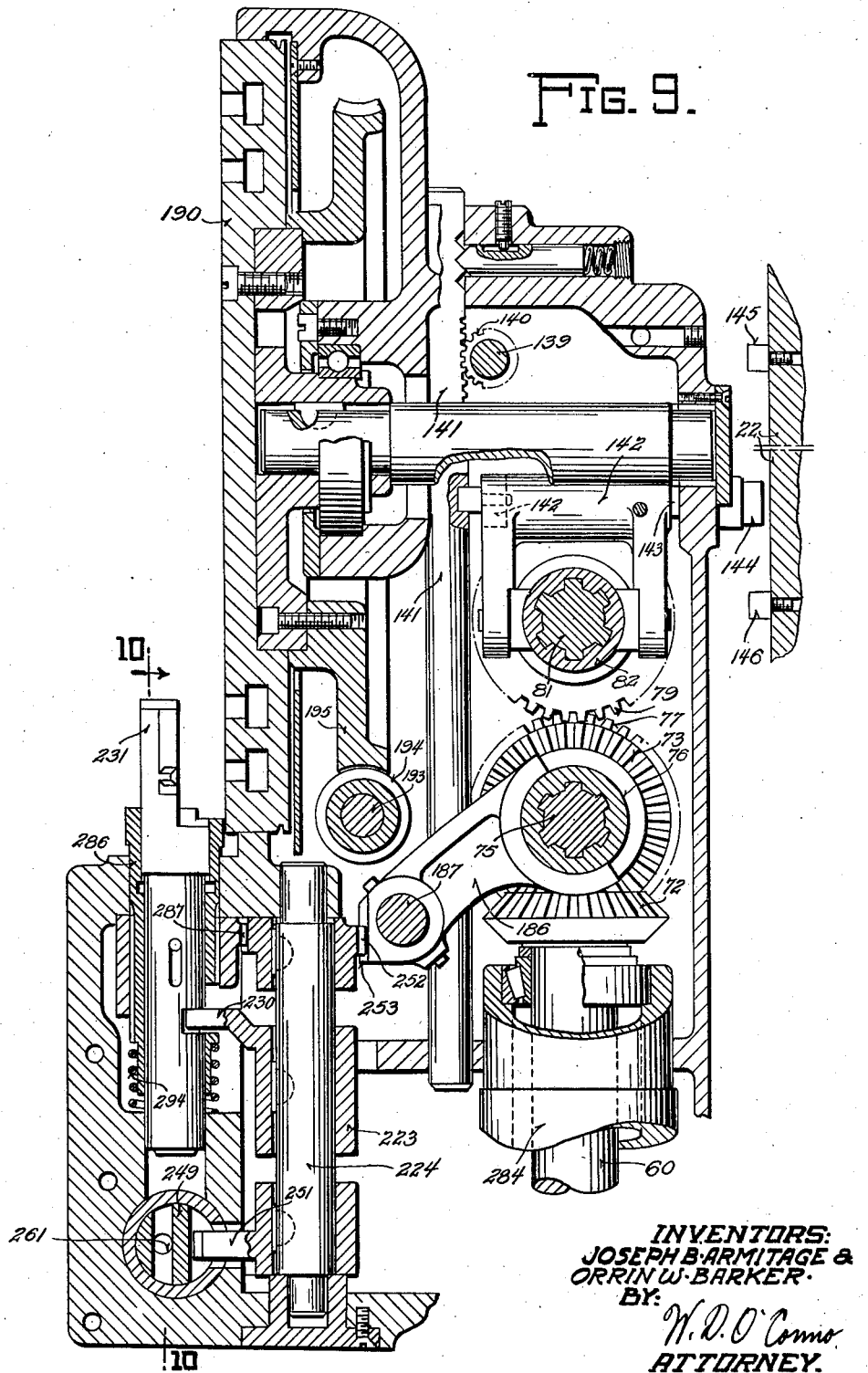

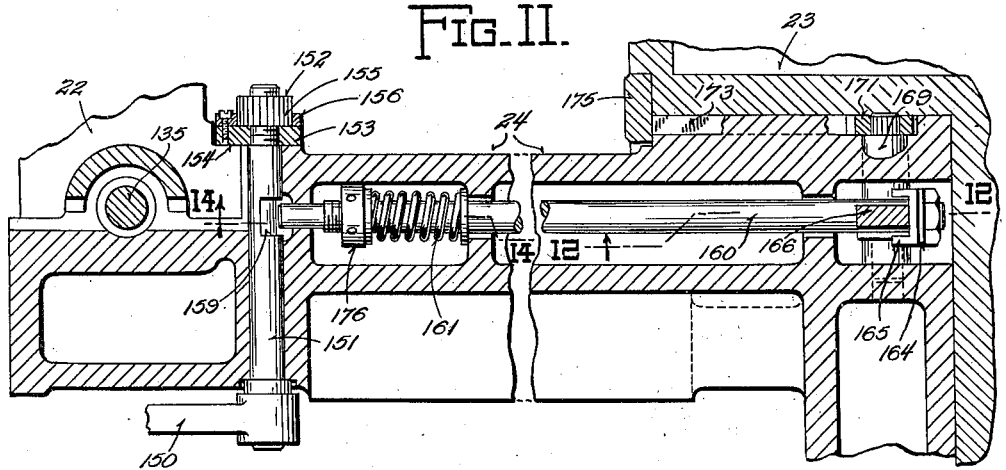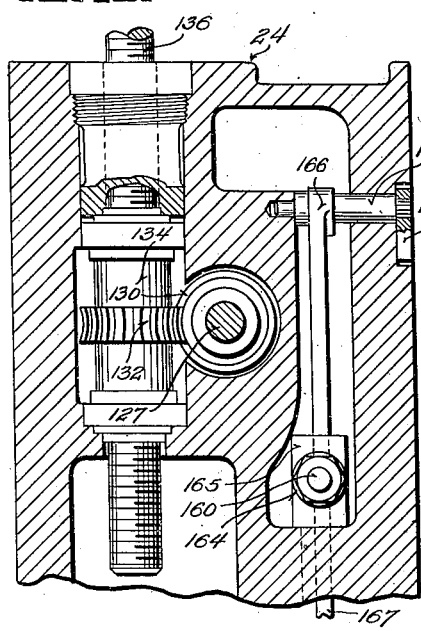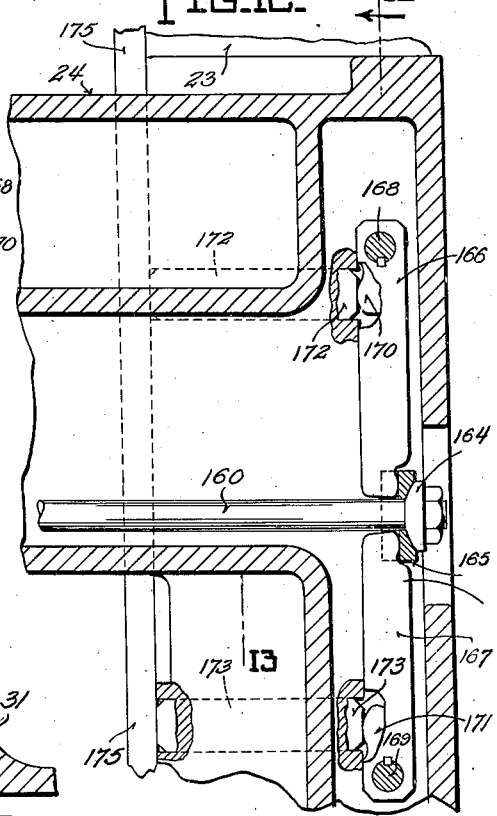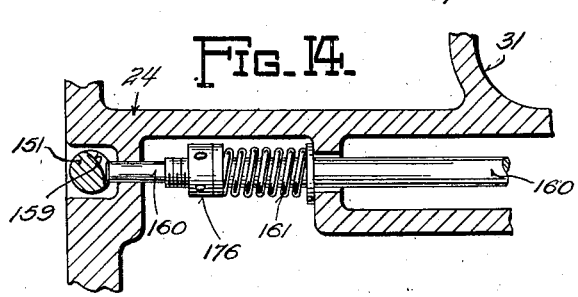

Patented Mar. 6, 1945

2,370,764

UNITED STATES PATENT OFFICE 2,370,764

MACHINE TOOL

Joseph B. Armitage, Wauwatosa, and Orrin W. Barker, Milwaukee, Wis., assignors to Kearney & Trecker Corporation, West Allis, Wis., a corporation of Wisconsin Application May 23, 1942, Serial No. 444,216

27 Claims. (Cl. 90—21)

This invention relates, generally, to improvements in machine tools and more particularly to novel machine structure and improved driving and controlling apparatus for a machine tool such as a milling machine of the rail type.

A general object of the present invention is to provide improved structural arrangements and improved transmission and control mechanism for a machine tool.

Another object of the invention is to provide a milling machine having a movable work supporting table and a movable cutter supporting head, wherein a single feed rate selecting mechanism is provided for effecting feeding movement of the table and the spindle head and separate rapid traverse driving mechanisms are provided for effecting rapid traverse movement of the table and spindle head at different rates.

Another object is to provide an improved machine tool transmission mechanism including a plurality of independently controlled rapid traverse clutches one of which is operative to transmit one rate of rapid traverse movement to one element of the machine and the other operative to transmit a different rate of rapid traverse movement to another element of the machine.

Another object is to provide an improved control mechanism for regulating the direction and rate of movement of the spindle head on the rail of a bridge type milling machine.

Another object is to provide a machine tool in which power transmission mechanism in the machine base is controlled by hydraulic control apparatus carried on a movable working member by means of hydraulic pressure derived from a pressure source in the machine base.

Another object is to provide an improved automatic trip mechanism for regulating the direction and rate of travel of the spindle head on the rail of a milling machine.

Another object is to provide an improved manually operable control mechanism for selecting the direction and rate of travel of the spindle head on the rail of a milling machine.

Another object is to provide an improved machine tool control apparatus including a tripping post for cooperating with control dogs on a movable member and a manual control arranged to select the rate and direction of movement of the movable member, in which means associated with the manual control function to withdraw the tripping post from the path of movement of the trip dogs.

Another object is to provide a milling machine of the rail type in which the spindle head on the rail is controlled in its movements along the rail by means of a control drum carried on the rail.

Another object is to provide a milling machine of the rail type in which the spindle motor is disposed to counterbalance the spindle on the rail and is connected to drive the spindle by a transmission mechanism extending through a slot in the rail.

Another object is to provide an improved spindle supporting head for a milling machine of the rail type.

A further object is to provide an improved hydraulic control system for controlling the movements of operating elements of a machine tool.

According to this invention as embodied in a milling machine of the bridge or rail type, improved transmission and control mechanism is provided including power actuated driving mechanism in the base of the machine that is connected by a single transmission shaft to apparatus on the rail for effecting movement of the rail, movement of the head along the rail, or movement of the spindle quill in the head, the various movements being effected in different directions selectively. A single feed rate changing mechanism in the machine base functions to establish a common feed rate for the work table and the spindle supports, while separate rapid traverse drives are provided to permit independent rapid traverse movement of the table and spindle at different rates. Vertical movement of the rail is effected by elevating nuts rotatably mounted in the ends of the rail and engaging cooperating screws fixed in the corresponding uprights, the transmission mechanism on the rail being operative to turn the nuts simultaneously. To provide for free movement of the head along the rail, the spindle driving motor is mounted on the opposite side of the rail from the spindle to counterbalance it, a transmission shaft extending from the motor through a longitudinal slot in the rail to drive the spindle. Movement of the head along the rail is controlled by means of a control drum carried by the rail and driven in synchronism with the head. Automatic control of the head moving transmission is effected in part by an improved hydraulic control system on the rail that derives pressure through a flexible conduit from a pump in the machine base, a second flexible conduit being connected from the movable rail to the base for controlling the rapid traverse drive to the rail. The control mechanism includes a tripping post associated with the control drum and a manually operable rate and direction controlling lever which is arranged to withdraw the tripping post from the path of trip dogs on the drum to permit manual control irrespective of the tripping mechaanism. Improved clamping means are provided on the rail to clamp both ends of the rail to the uprights simultaneously.

The present invention is exemplified herein by a practical embodiment in a milling machine of the bridge or rail type. However, it is to be understood that the particular structure set forth is intended to be illustrative only and that apparatus of different construction may be utilized in practicing the various novel characteristics of the invention within the range of equivalents of the features defined in the subjoined claims.

The foregoing and other objects of this invention, which will become more fully apparent from the following detailed description, may be achieved by the exemplifying apparatus described herein in connection with the accompanying drawings, in which:

Fig. 3 is a fragmentary top plan view of the machine, showing the relative position of the spindle head, rail and rail supporting uprights;

Fig. 4 is a fragmentary view in rear elevation of the machine showing the spindle head, the rail, and the rail supporting uprights;

Fig. 5 is a schematic diagram of the transmission mechanism contained in the base of the machine;

Fig. 6 is a view in vertical section of a portion of the transmission mechanism mounted on the rail, taken substantially on the line 6—6 of Fig. 2, showing gearing to transmit driving power from the single vertical driving shaft, to the quill, rail and spindle head shafts.

Fig. 7 is a view in vertical section, taken substantially on the line 7—7 of Fig. 6, showing the transmission mechanism for driving the automatic control drum for the spindle head movement and also the driving connection for actuating the spindle head and one of the rail elevating nuts;

Fig. 8 is a view in vertical section through a portion of the spindle head, taken substantially on the line 8—8 of Fig. 3, and showing a portion of the quill and spindle head transmissions;

Fig. 9 is a view in vertical section, taken substantially on the line 9—9 of Fig. 1, showing a portion of the drum transmission and the automatic control mechanism for regulating the direction and rate of movement of the spindle head;

Fig. 11 is a view in horizontal section, taken substantially on the line 11—11 of Fig. 2, showing the rail clamping mechanism;

Fig. 12 is a view in vertical section, taken substantially on the line 12—12 of Fig. 11, showing a portion of the rail clamping mechanism;

Fig. 13 is a view in vertical section, taken substantially on the line 13—13 of Fig. 12, showing the rail clamping mechanism in end elevation and also showing the arrangement for mounting the nut that is operative to raise and lower the rail in the uprights; and Fig. 14 is a detail sectional view, taken on the line 14—14 of Fig. 11, showing the cam surface operative to release the clamping action of the mechanism shown in Figs. 12 and 13.

The particular machine tool shown in the accompanying drawings as exemplifying a preferred embodiment of the invention, is a milling machine of the bridge or rail type, although it is to be understood that various characteristics of the invention may be utilized to advantage in other machine tools of different construction.

Figure 1:
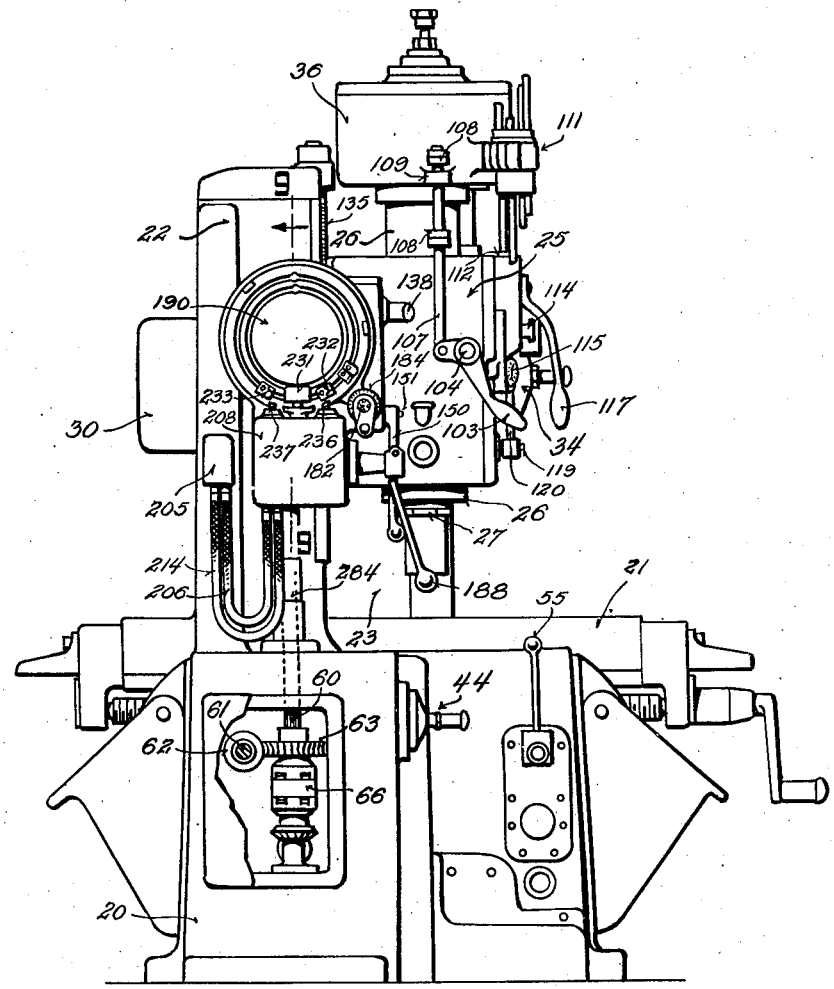
Figure 1 is a view in front elevation of a bridge type milling machine embodying the novel features of this invention.
Figure 2:
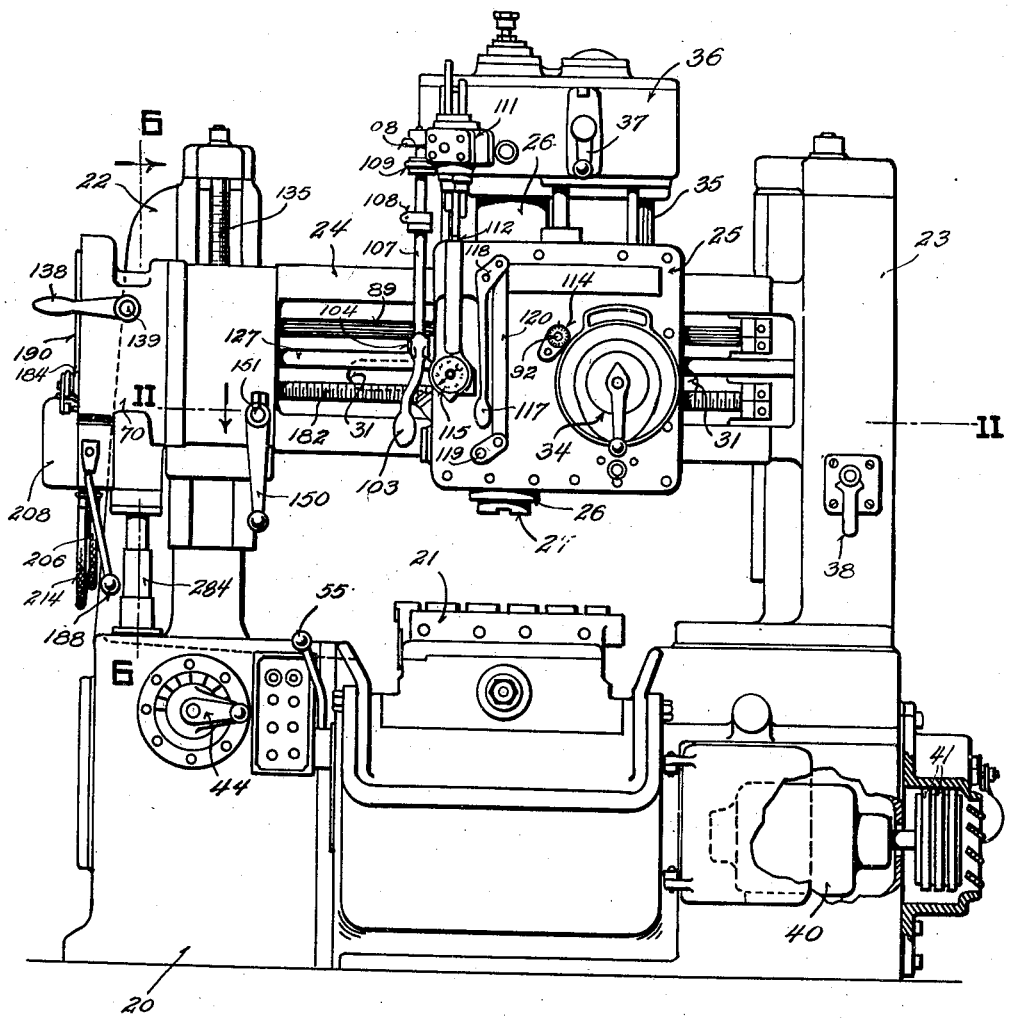
Fig. 2 is a view in right side elevation of the machine shown in Fig. 1.

Referring more particularly to Figs. 1 and 2 of the drawings constituting front and side views of the entire machine, it will be seen that the structure comprises essentially a base or bed 20 of hollow construction that constitutes the foundation or main frame of the machine and serves as a housing for some of the actuating mechanism. The upper surface of the bed 20 carries a work supporting table 21 that is arranged for longitudinal reciprocatory feeding movement in the usual manner. At the forward side of the work supporting table 21, the bed 20 supports a forward upright or column 22 arranged in spaced opposition to a rear upright or column 23 that is supported on the base 20 at the rear side of the table 21. As best shown in Fig. 2, the uprights 22 and 23 function to support the respective ends of a spindle supporting cross rail structure 24 in manner to permit vertical adjustment of the rail, the rearward end of the rail being arranged for sliding movement between opposed vertical faces interiorly of the rear upright 23, and the forward end being slidably mounted on the right face of the forward upright 22.

The rail 24 carries a spindle head 25 that is arranged for horizontal adjustment or traversing movement longitudinally of the rail. The spindle head 25 in turn, carries a spindle quill 26 that is slidably mounted therein for vertical axial movement and that rotatably supports a tool spindle 27 disposed in cooperative relationship with the work table 21.

As best shown in Figs. 1 and 3, the spindle 27 and its supporting quill 26 are mounted in the head 25 at the right side of the rail 24 in position to be observed conveniently by an operator standing at the front of the machine at the right of the forward column 22. Power for rotating the spindle 27 to drive a cutter carried by it in operating upon a workpiece carried by the table 21, is provided by a spindle driving motor 30. In order that the weight of the motor 30 may serve to counterbalance the weight of the spindle and quill, the motor is carried by the head 25 at the left side of the rail 24 opposite from the spindle, being connected to the head both above and below the rail. As best shown in Fig. 8, power from the motor at the left side of the rail is transmitted to the spindle at the right side thereof, through a longitudinal slot 31 formed along the neutral axis of the rail, by means of a transmission shaft 32 which constitutes an extension of the motor shaft and projects through the slot 31 into the spindle head structure. The projecting end of the shaft 32 is provided with a worm gear 33 that engages and drives the first gear of a speed changing transmission mechanism housed within the spindle head 25. The speed changing mechanism is arranged to be adjusted by means of a speed changing lever and dial mechanism 34 on the side of the spindle head, as best shown in Fig. 2. From the speed changing mechanism, power is transmitted through a splined shaft 35 to a range changing mechanism mounted in a housing 36 carried by the upper end of the quill 26 and arranged to be adjusted by means of a range changing lever 37. By this arrangement, the spindle driving motor is disposed in counterbalancing position at the opposite side of the rail from that occupied by the spindle 27 and its supporting structure, and the transmission train for driving the spindle at the desired speed is carried directly from the motor 30 through the slot 31 in the rail to the speed adjusting mechanism associated with the spindle. Control of the spindle motor to regulate the direction of rotation of the spindle is effected by a spindle reversing switch 38 mounted on the rear upright 23.

Power for effecting positioning movements of the spindle 27 and work supporting table 21 is derived from a motor 40 mounted within the base 20 of the machine, as shown in Fig. 2. As indicated diagrammatically in Fig. 5, power from the motor 40 is transmitted by a multiple belt transmission 41 to a main shaft 42 journalled in the bed 20 and extending forward into driving engagement with a feed rate changing mechanism 43 that is mounted in the bed beneath the forward upright 22 and arranged to be adjusted by a rate changing lever and indicating mechanism 44 shown in Figs. 2 and 5. From the rate changing mechanism 43, power is transmitted at the selected feed rate through a shaft 45 to drive the work table 21. As shown in Fig. 5, the shaft 45 is provided at its remote end with a worm 46 meshing with a worm wheel 47 which turns a shaft 48 that drives table reversing mechanism 49 of well known type. The reversing mechanism in turn drives a table actuating screw 50 which constitutes part of the usual screw and nut mechanism for moving the table 21 in either direction selectively at the selected feed rate.

Power for moving the work table 21 at rapid traverse rate is derived from the main shaft 42 through a gear train 52 of predetermined ratio which is arranged to be connected selectively by means of a rapid traverse clutching mechanism 53 to the table driving shaft 48, the clutching mechanism being of the type including a friction rapid traverse clutch and an overrunning clutch permitting rapid traverse movement of the shaft 48 without opposition from the feed rate driving worm and worm wheel connection. Operation of the work table 21 in either direction at either the selected feed rate or the predetermined rapid traverse rate may be controlled manually by means of a direction and rate selecting control lever 55, Figs. 1 and 2, or automatically by means of the usual trip mechanism associated with the table.

Power for effecting either feeding movement or rapid traverse movement of the spindle 27 bodily along its several paths of movement provided by the movable rail and head supporting structure, is likewise derived from the motor 40 and main shaft 42 in the base 20 of the machine, a single vertically disposed transmission shaft 60 being provided in the forward upright 22 for effecting a driving connection from the machine base to the vertically movable rail 24. As indicated in Fig. 5, the rate of feeding movement of the spindle 27 is determined by the rate changing mechanism 43 and is the same as that of the work table 21. As shown, another feed rate shaft 61 extends from the other side of the rate selector 43 and is connected by a worm 62 meshing with a worm wheel 63 to drive the vertical shaft 60 at the selected feed rate.

Movement of the spindle 27 bodily at rapid traverse rate is likewise accomplished by power derived from the main shaft 42, in this instance through a gear train 65 having a driving ratio different from that of the table driving rapid traverse train 52. As shown, the train 65 is connected to drive a feed and rapid traverse clutch mechanism 66 generally similar to the table driving mechanism 53 and operative in like manner to transmit power at feed rate through an overrunning clutch from the worm wheel 63 to the vertical shaft 60, or to transmit power at rapid traverse rate from the train 65 to the vertical shaft 60 selectively without interference from the feed drive, by reason of the overrunning clutch connection. By this arrangement, the cutter spindle 27 may be moved bodily at a rate of feeding movement equal to that of the table 21 or selectively at a rapid traverse rate different from and preferably lower than that of the table.

As appears in Fig. 6, the single vertical shaft 60 is journalled at its upper end in a gear housing 70 that is secured to the forward end of the rail 24, the lower end of the shaft 60 being splined in the driving mechanism 66, as indicated in Figs. 1 and 5, in manner to permit vertical movement thereof with the rail 24 without interfering with the driving connection. Referring again to Fig. 6, it will be seen that the shaft 60 is provided at its upper end with a bevel gear 72 which meshes with cooperating reversing clutch bevel gears 73 and 74 that are rotatably mounted on a head traversing shaft 75 to which either one may be operatively connected selectively through engagement by a shiftable clutch 76 slidably splined on the saft 75. The reversing bevel gears 73 and 74 have formed integrally with them spur gears 77 and 78, respectively, which mesh with spur clutch gears 79 and 80 rotatably mounted on a rail driving shaft 81. Slidably splined on the shaft 81 between the clutch gears 79 and 80 is a reversing clutch spool 82 that may be moved into clutching engagement with either gear selectively for turning the shaft 81 in either direction to raise or lower the rail as desired.

As shown, the spur clutch gear 80 has formed with it another spur gear 84 that meshes with a complementary spur gear 85 fixed on one end of a quill driving shaft 86, the gear train from the shaft 60 constituting a positive connection for driving the shaft 86 in one direction continuously. The shaft 86 is journalled within the housing 70 and is provided at its other end with a bevel pinion 87. The bevel pinion 87 meshes with a bevel gear 88 on the forward end of a quill driving splined shaft 89 which is journalled in and extends longitudinally of the rail 24, as appears in Figs. 2 and 7. As best shown in Fig. 8, the quill driving shaft 89 passes through the spindle head 25 and has splined connection therein with a bevel gear 90 that is rotatably mounted in the head for traversing movement with it along the rail, the splined connection maintaining driving relationship with the shaft 89 at any position of the head on the rail. The bevel gear 90 meshes with a bevel pinion 91 mounted on the end of a shaft 92 that is journalled in the head 25 at right angles to the rail 24.

The shaft 92 has rotatably mounted on it a pair of bevel reversing clutch gears 94 and 95 either one of which may be clutched to the shaft 92 upon engagement by a shiftable clutch collar 96 splined on the shaft between them. The reversing gears 94 and 95 both mesh with a bevel gear 97 fixed on the lower end of a quill elevating screw 98, whereby the screw may be turned in the one or the other direction selectively depending upon which reversing gear is clutched to the shaft 92. The elevating screw 98 is rotatably mounted in the head 25 and has threaded engagement with a cooperating nut 99 that is fixed in the housing 36 mounted on the upper end of the quill 26, the arrangement being such that when the elevating screw 98 is rotated, the quill 26 is caused to have vertical sliding movement relative to the head 25.

Control of the direction of movement of the quill 26 is effected by means of a control lever 103 mounted at the forward side of the head 25, as shown in Fig. 2, on the end of a control shaft 104 which carries a fork 105 (Fig. 8) that engages the shifting collar 96. Associated with the control lever 103 is a limit stop rod 107 carrying adjustable limit stops 108 arranged to be engaged by an abutment 109 on the quill housing 36 in such manner that the clutch collar 96 will be shifted to neutral position when the quill arrives at its limiting position at either end of its course of travel. For precisely positioning the quill 26, there is provided on the quill housing 36 a multiple position stop mechanism 111 that is arranged to engage a stop rod 112 in the head 25 in the course of downward movement of the quill, the rod being operatively connected to the control shaft 104 in manner to effect movement of the clutch collar 96 to neutral position when the quill arrives at a predetermined point. Further precise positioning of the quill may then be effected by turning a hand crank or the like (not shown) which may be applied to the outer end of the shaft 92, the position of the quill being noted by reference to a micrometer dial 114 on the end of the shaft 92 and to a sensitive dial indicator 115 that is arranged to be engaged by the lower end of the stop rod 112. After the quill has been thus moved to adjusted position, it may be clamped rigidly to the head 25 by operating a quill clamping lever 117 that actuates upper and lower clamping screws 118 and 119 which are interconnected by a link mechanism 120.

As previously mentioned with reference to Fig. 6, power for raising or lowering the rail 24 is derived from the single vertical shaft 60 through the bevel gear 72 and one or the other of the reversing spur gear trains 77 and 79 or 78 and 80 through engagement therewith of the clutch spool 82 on the rail driving shaft 81, the shaft 81 thus being turned in the one or the other direction selectively. As appears in Figs. 6 and 7, the shaft 81 is provided at its end with a bevel pinion 125 which meshes with a bevel gear 126 on the forward end of a rail elevating shaft 127 which is journalled in and extends longitudinally of the rail 24. As shown in Figs. 3, 4, 7 and 13, the shaft 127 is provided near its forward end adjacent to the forward column 22 with a helical or worm gear 129, and at its rearward end within the rear column 23 with a similar helical or worm gear 130. The worm gears 129 and 130 mesh respectively with worm wheels 131 and 132 fixed on rail elevating nuts 133 and 134 that are rotatably mounted in the forward and rearward ends of the rail 24 respectively. To provide for elevating the rail, the nuts 133 and 134 have threaded engagement with elevating screws 135 and 136 respectively, the screw 135 being fixed in the forward column 22 and the screw 136 in the rearward column 23, as best shown in Fig. 4. By this arrangement, the rotatably mounted elevating nuts at the respective ends of the rail 24 may be turned in synchronism in one or the other direction in accordance with the connection established by the reversing clutch sleeve 82, to elevate or lower the rail as may be required.

Engagement of the clutch 82 is effected by actuating a rail controlling lever 138 mounted on the side of the housing 70 at the front end of the rail. As shown in Fig. 2, the lever 138 is fixed on the projecting end of a control shaft 139 carrying a pinion 140 (Fig. 6) that meshes with a complementary rack on a vertically movable control shaft 141. The control shaft 141 engages one end of a bell crank 142 the other end of which constitutes a fork that engages the reversing spool 82, the arrangement being such that when the lever 138 is moved upward or downward, the control rod 141 is moved similarly and causes the bell crank 142 to shift the clutch 82 in direction to effect power connection for driving the rail 24 in the corresponding direction. The bell crank 142 is fixed on another control shaft 143 which is journalled in the housing 70 parallel with the rail 24. As shown in Fig. 9, the rearward end of the shaft 143 is provided with a lever arm 144 that projects to a position adjacent to the forward column 22. The projecting lever arm 144 is arranged to engage in its course of travel with upper and lower limit stops 145 and 146 respectively which are fixed on the forward face of the column 22 and arranged to turn the control shaft 143 in manner to move the reversing clutch sleeve 82 to neutral position when the rail arrives at either its upper or its lower limit of travel.

After the rail 24 has been moved by the power elevating mechanism to a predetermined position, it may be clamped at its ends to the forward and rear uprights simultaneously by actuating a clamping lever 150 mounted on the right side of the forward end of the rail, as shown in Figs. 1 and 2. Referring now to Fig. 11, the clamping lever 150 is fixed on the outer end of a clamping shaft 151, the other end of which is threaded and has engagement with a clamping nut 152. The nut 152 is carried by a gib 153 which engages a clamping surface 154 on the upright 22 in opposition to the rail engaging face thereof, the arrangement being such that when the lever 150 is turned to effect a clamping operation, the action of the nut 152 on the clamping shaft 151 draws the rail into clamping engagement with the face of the upright 22. The nut 152 is provided with closely spaced external serrations 155 arranged to engage complementary internal serrations in a locking element 156 fixed on the gib 153, the arrangement being such that the nut 152 may be withdrawn from and turned relative to the locking element 156 to effect an initial adjustment of the clamping action.

To provide for clamping and unclamping both ends of the rail simultaneously, the clamping shaft 151 is provided with a cam element 159, shown in Figs. 11 and 14, that engages the end of an actuating rod 160 which actuates clamping mechanism engaging the rear upright 23. The rod 160 is provided with a heavy compression spring 161 which functions to move it to clamping position, the cam 159 being shaped to move out of contact with the end of the rod when the lever 150 is turned to clamping position, and to exert force upon the end of the rod in opposition to the spring 161 when the lever is turned to unclamping position.

As shown in Figs. 11 and 12, the clamping rod 160 is provided at its other end within the interior of the rear column 23 with a spherical washer 164 that engages a complementary spherical seat in an equalizing block 165 that engages the ends of upper and lower clamping levers 166 and 167 respectively in manner to exert equalized force upon them. The clamping levers 166 and 167 are fixed on upper and lower clamp actuating shafts 168 and 169 rotatably mounted in horizontal position in the rearward end of the rail. As shown in Figs. 11, 12 and 13, the shafts 168 and 169 are serrated at their ends to receive clamping cam members 170 and 171, respectively, having complementary closely spaced internal serrations. The clamping cam members in turn engage the ends of clamping bars 172 and 173 that are slidably mounted in the rail structure and arranged to engage with their other ends a gib 175 fixed on the upright 23. When the clamping lever 150 is turned to clamping position thereby releasing the clamping rod 160, the spring 161 urges the rod to the left and applies equalized clamping forces to the levers 166 and 167. The levers turn the shafts 168 and 169, thereby causing the cams 170 and 171 to force the clamping bars 172 and 173 against the gib 175. Any inequality in the clamping action between the upper and lower bars 172 and 173 may be corrected by adjusting the positions of the cam elements 170 and 171 on their serrated shafts. The total clamping pressure may be adjusted readily by turning an adjusting lock nut 176 on the rod 160 to regulate the tension of the spring 161.

Referring again to Figs. 6 and 7, the mechanism for traversing the head 25 along the rail 24 is driven by the previously mentioned head traversing shaft 75, that may be turned in the one or the other direction through engagement of the clutch sleeve 76 with the one or the other of reversing gears 73 or 74. As in the case of the quill and rail driving shafts, the head traversing shaft 75 is provided at its end with a bevel gear 180 that meshes with a complementary bevel gear 181 on a threaded shaft or lead screw 182 which is journalled in and extends longitudinally of the rail 24. The threaded shaft 182 passes through the spindle head 25 and has threaded engagement therein with a fixed nut 183 secured in the head in such manner that when the shaft 182 is turned, the head 25 is caused to move along the rail 24. As appears in Figs. 1, 2 and 7, the forward end of the shaft 182 is adapted to receive an actuating crank or the like (not shown) by means of which it may be turned manually to move the head, a micrometer dial 184 being provided on the projecting end of the shaft to indicate the extent of the movement.

Engagement of the clutch collar 76 with one or the other reversing clutch gear to effect traversing movement of the spindle head in the desired direction is accomplished by means of a shifting fork 186, shown in Fig. 9, that engages the clutch collar 76 and is arranged for axial sliding movement along a guide rod 187. Movement of the shifting fork 186 under manual control is effected by actuating a control lever 188 mounted at the right side of the housing on the forward end of the rail and that functions through hydraulically actuated control mechanism to move the shifting fork as required. Automatic control of movement of the head 25 is accomplished by means of a control drum 190 rotatably mounted at the front end of the rail 24 and carrying trip dogs which function to operate the shifting fork 186 either directly or through the hydraulic system, the hydraulic system being arranged also to provide for engaging or disengaging the rapid traverse clutch mechanism in the base 20 of the machine for actuating the spindle carrying elements selectively at rapid traverse rate. In order that the control drum 190 may be turned in synchronism with traversing movement of the head 25, the head traversing screw shaft 182 is provided at its forward end with an additional bevel gear 191 (Fig. 7) that meshes with a bevel gear 192 on a shaft 193 disposed parallel with and in front of the head traversing shaft 75. As appears in Fig. 9, the shaft 193 is provided with a worm 194 that meshes with a worm wheel 195 secured to the rear side of the control drum 190, the drum 190 and worm wheel 195 being rotatably mounted in the housing 70.

The hydraulic system for shifting the direction selecting clutch collar 76 in the head traversing drive and for actuating the spindle moving rapid traverse driving mechanism 66, includes a pressure pump 201 that is mounted in the base 20 of the machine and operatively connected to be driven by the main shaft 42, see Fig. 5. As shown diagrammatically in Fig. 10, the pump 201 withdraws pressure fluid from a sump 202 in the bottom of the machine bed 20, through a conduit 203 and forces it through a conduit 204 extending upward through the forward upright 22, to a junction box 205 on the front of the upright (Fig. 1). From the junction box 205, the pressure fluid flows through a flexible conduit 206 that leads to a pressure limiting relief valve 207 mounted in a valve chamber 208 attached to the front of the housing 70 on the forward end of the rail 24 as shown in Fig. 1 and movable bodily with the rail. From the pressure regulating valve 207, excess pressure fluid escapes through a conduit 209 into the lubricating system for the gearing within the housing 70.

Pressure fluid may flow from the relief valve 207 through a conduit 211 leading to a rapid traverse poppet valve 212 which when opened admits pressure to a conduit 213 that connects with a second flexible conduit 214 leading back to the junction box 205 from which a conduit 215 leads down through the forward upright to the rapid traverse driving mechanism 66. The arrangement is such that when pressure is admitted through the poppet valve 212 to the rapid traverse mechanism 66, the rapid traverse friction clutch is engaged to drive the vertical shaft 60 at rapid traverse rate, thereby providing for moving the spindle supporting structure at rapid traverse rate.

Figure 10:
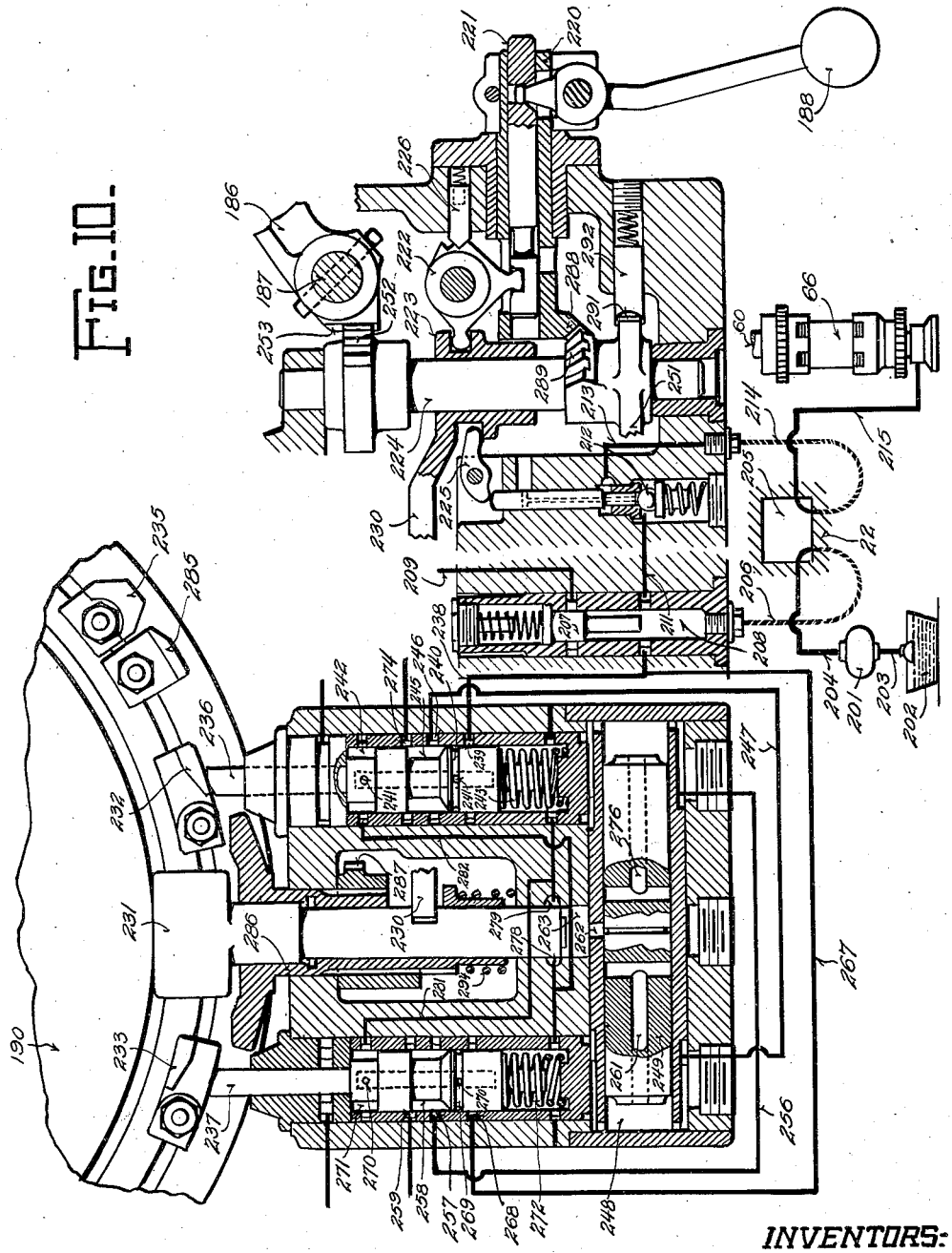
Fig. 10 is a view, partly in vertical section, taken substantially on the line 10—10 of Fig. 9, showing the relative position of the trip actuated elements and a schematic diagram of the hydraulic control system for effecting changes in rate and direction of movement of the spindle head.

Operation of the rapid traverse poppet valve 212 may be effected manually by movement of the rate and direction controlling lever 188 outwardly or to the right, from the position shown in Figs. 1 and 10. As shown in Fig. 10, the lever 188 is pivotally mounted on a sleeve 220 in manner to permit the required tilting movement, and its inner end is arranged to engage an axially movable control rod 221 slidably mounted within the sleeve 220. The rod 221 engages at its inner end with one arm of a bell crank 222 which engages with its other arm a vertically slidable sleeve 223 carried by a rotatable vertical control shaft 224. The sleeve 223 in turn engages one end of a pivoted lever 225, the other end of which contacts and operates the rapid traverse poppet valve 212, the arrangement being such that when the lever 188 is moved outwardly or to the right, the sleeve 223 is moved upward and the valve 212 is moved downward to open position to effect rapid traverse drive, the bell crank 222 being provided with detent notches cooperating with a spring urged detent plunger 226 to retain the lever in either its outer or inner position.

As best shown in Fig. 9, the vertically movable sleeve 223 is provided with a projecting arm 230 which engages a vertically movable tripping post 231. As shown in Fig. 10, the tripping post 231 is arranged to be moved upward through engagement by a rapid traverse dog 232 on the control drum 190, thereby moving the sleeve 223 upward and opening the rapid traverse poppet valve 212. Similarly, a feed rate dog 233 on the drum 190 functions to move the tripping post 231 downward and closes the rapid traverse valve 212. As previously explained, opening of the rapid traverse valve 212 effects rapid traverse operation of the vertical shaft 60 and rapid traverse movement of the rail, the head, or the quill in accordance with the positions of the various reversing and disconnecting mechanisms controlling these elements.

To provide for an automatic cycle of operation in moving the head 25 along the rail 24, the control drum 190 may be fitted with reversing dogs, such as the reversing dog 235 which project outwardly from the control drum in position to engage reversing valve plungers 236 and 237 for effecting reversing action in opposite directions respectively. Assuming the control drum 190 to be turning clockwise in Fig. 10, when the reversing dog 235 engages the valve plunger 236, the plunger is moved downward to admit pressure fluid which flows from the relief valve 207, through a conduit 238 to a port 239 which is then in communication with a narrow groove 240 in the valve plunger that connects with a central passageway 241 leading to a pressure chamber 242 at the upper end of the valve. Pressure in the chamber 242 causes the valve plunger 236 to be moved downward a further distance against the action of a spring 243 which normally holds the plunger in its upper position. With the valve plunger 236 in its lower position, communication is established from the pressure port 239 through a groove 245 in the valve plunger to a port 246 from which a conduit 247 leads to the left end of a reversing cylinder 248, the pressure acting upon a cooperating piston 249, moving it to the right from the neutral position shown in the drawings. When the reversing piston 249 moves to the right, it exerts force upon an actuating arm 251 which is keyed to the vertical control shaft 224, as shown in Fig. 9, causing the shaft to be turned about its axis. As indicated in Figs. 9 and 10, the shaft 224 is provided at its upper end with a gear segment 252 which engages rack teeth 253 on the reverse shifting fork 186 and moves it to shift the reversing clutch 76 into engagement with the reversing clutch gear 73.

Fluid in the right end of the reversing cylinder 248 is forced outward through a conduit 256 to a port 257 that communicates with a groove 258 in the other reversing plunger 237 from which it escapes through an exhaust port 259 that opens into the interior of the valve chamber 208.

When the reversing piston 249 arrives at its right position, it establishes communication through a passageway 261 extending from the end to the side of the piston, with a port 262 in the cylinder wall leading to a chamber 263 at the lower end of the tripping post 231. Pressure in the chamber 263 moves the tripping post 231 upward to rapid traverse position, causing the sleeve 223 to move upward and the rapid traverse poppet valve 212 to open, as previously explained. This results in the spindle head 25 being moved in reverse direction at rapid traverse rate, the movement ordinarily continuing at rapid traverse rate until another trip dog on the drum 190 moves the tripping post 231 down to feed position.

If now another reversing dog 235 contacts and depresses the other reversing valve plunger 237, pressure is admitted from the relief valve chamber 207 through a conduit 267 to a pressure port 268 which then communicates with a narrow groove 269 in the valve plunger 237 from which a passageway 270 leads to a pressure chamber 271 at the top of the valve. As in the previous instance, the valve plunger 237 is then moved further downward against the pressure of a spring 272 and communication is established from the pressure port 268 through the groove 258 to the port 257 from which the conduit 256 leads to the right end of the reversing cylinder 248. Pressure in the right end of the cylinder 248 moves the piston 249 to the left thereby shifting the reversing clutch sleeve 76 into engagement with the reversing clutch gear 74 to effect movement of the spindle head in the other direction. Fluid in the left end of the cylinder 248 escapes through the conduit 247, the port 246 and the groove 245 in the valve plunger 236 to an exhaust port 274 which discharges into the interior of the valve chamber 208.

When the piston 249 arrives at the left end of the cylinder, communication is established from the right end of the cylinder through a passageway 276 in the piston to the port 262 leading to the chamber 263, the pressure causing the tripping post 231 to be moved up to the rapid traverse position, as previously explained. When the tripping post 231 is in the upper or rapid traverse position, its lower end uncovers ports 278 and 279, thereby establishing communication between them and permitting pressure fluid in the upper ends of the reversing valves to escape through passages 281 and 282, that are completed through the connected ports 278 and 279 to the lower ends of the reversing valves, thereby neutralizing the valves and permitting the springs 243 and 272 to move them upward to their initial positions.

Pressure fluid which escapes from the exhaust ports of the control system and accumulates from the lubrication system supplied by the conduit 209, flows into the bottom of the gear housing 70 and drains through a telescopic tube 284 (Figs. 1 and 2) surrounding the vertical transmission shaft 60, back into the base 20 of the machine, the telescopic tube constituting also a guard for the transmission shaft.

For stopping the movement of the spindle head 25 at a predetermined position, the control drum 190 is provided with stop dogs such as the dog 285. As shown in Figs. 9 and 10, the stop dog 285 is positioned to engage tripping arms on a tripping sleeve 286 that is rotatably mounted concentric with the tripping post 231 and carries a gear segment 287 arranged to mesh with the gear segment 252 on the vertical control shaft 224, the arrangement being such that when either tripping arm of the sleeve 286 is engaged by a stop dog 285, the sleeve and the control shaft 224 are turned in manner to move the shifting fork 186 to a position in which the clutch sleeve 76 is out of engagement with both clutch gears 73 and 74. As shown in Fig. 10, it is preferable that a stop dog 285 be associated with each reversing dog 235 in such manner that should the hydraulic reversing mechanism fail to function, the stop dog will act upon the mechanical linkage to stop further movement of the head.

As previously mentioned, manual control of the direction of movement of the head is effected by moving the lever 188 in direction transverse to its movement for effecting change of rate. As shown in Fig. 10, the sleeve 220 which carries the lever 188 is provided at its inner end with a bevel gear segment 288 that meshes with a similar bevel gear segment 289 fixed on the control shaft 224, the arrangement being such that when the lever 188 is moved from side to side, the shifting fork 186 and the reversing clutch sleeve 76 are moved in like manner to effect the reversing operation. For retaining the clutch sleeve 76 in the desired position, the gear segment 289 is provided with detent notches 291 which cooperate with a spring pressed detent plunger 292 in the usual manner.

In the event that it becomes desirable to effect further movement of the spindle head after it has been stopped by operation of a stop dog 285 upon the tripping sleeve 286, an arrangement is provided for withdrawing the tripping sleeve from the path of the dog to permit reengagement of the clutch sleeve 76. This is accomplished by moving the lever 188 inwardly beyond its normal feed rate position thereby moving the plunger 221 to the right, from the position shown in Fig. 10, and drawing the sleeve 223 further downward along the shaft 224. The arm 230 of the sleeve 223 then forces the tripping post 231 and the tripping sleeve 286 downward against the action of a spring 294 to move the tripping arm of the sleeve below the stop dog 285. The lever 188 may then be pivoted sideways to reengage the reversing clutch, the tripping arm passing beneath the stop dog. Upon releasing the lever 188, the spring 294 tends to move the tripping sleeve 286 upward to its normal position.

To prevent the spindle head 25 from continuing its movement to a position beyond its safe limit of travel, the control drum 190 is preferably provided with fixed limit stop dogs which engage the tripping sleeve to throw out the clutch when the head arrives at its limit of movement in either direction.

From the foregoing detailed explanation of the construction and operation of the rail type milling machine herein set forth as a practical embodiment of the present invention, it will be apparent that there has been provided an improved machine structure and control mechanism adapted to facilitate operation of the equipment in performing its machining functions.

The illustrative embodiment of the invention has been described in considerable detail for the purpose of fully disclosing structure by means of which the invention may be practiced, but it is to be understood that the particular apparatus described is intended to be illustrative only and that various novel characteristics of the invention may be incorporated in other structural forms without departing from the spirit and scope of the invention as defined in the subjoined claims.

The principles of the invention having now been fully explained in connection with the foregoing description of an illustrative preferred embodying structure, we hereby claim as our invention or discovery:

1. In a machine tool of the rail type, a base, a pair of spaced uprights upstanding from said base, a spindle carrying rail slidably mounted for vertical movement along said uprights, a spindle head slidably mounted on said rail, actuating means carried by said rail and operative to effect movement of said rail along said uprights and movement of said head along said rail selectively in either direction, a single shaft extending from said base to said rail and operatively connected to drive said actuating means on said rail, means in said base operatively connected to drive said shaft at a selected feed rate for transmitting feeding movement to said rail and said head, selectively engageable means in said base operative to drive said shaft at rapid traverse rate for moving said rail and head rapidly, and trip mechanism carried by said rail and operatively connected to control engagement of said rapid traverse means in said base.

2. In a machine tool of the rail type, a base, a pair of uprights associated with said base, a spindle carrying rail slidably mounted on said uprights for vertical movement, a spindle head slidably mounted on said rail for horizontal movement, a spindle quill slidably mounted in said head, a single shaft arranged to transmit power from said base to said rail, means in said base operative to drive said shaft at a selected rate, transmission mechanism on said rail arranged to be driven by said single shaft and operative selectively to effect raising or lowering of said rail, transmission mechanism on said rail arranged to be driven by said single shaft and operative to effect sliding movement of said head along said rail in the one or the other direction selectively, a control drum associated with said head moving transmission mechanism and operative to control the movement of said head, other transmission mechanism arranged to be driven by said single shaft and operatively connected to effect feeding movement of said quill in the one or the other direction selectively, control means mounted on said rail and operatively connected to effect adjustment of the rate at which said single shaft is driven by said driving means in said base, and means associated with said control drum and operative to actuate said rate control means in response to movement of said spindle head.

3. In a machine tool of the rail type, a base, a pair of uprights associated with said base, a spindle carrying rail slidably mounted on said uprights for vertical movement, a spindle head slidably mounted on said rail for horizontal movement, a spindle quill slidably mounted in said head, a single shaft arranged to transmit power from said base to said rail, means in said base operative to drive said shaft at either feed or rapid traverse rate, transmission mechanism on said rail arranged to be driven by said single shaft and operative selectively to effect raising or lowering of said rail, transmission mechanism on said rail arranged to be driven by said single shaft and operative to effect sliding movement of said head along said rail in the one or the other direction selectively, a control drum associated with said head moving transmission mechanism on said rail and operative to control the movement of said head, other transmission mechanism arranged to be driven by said single shaft and operatively connected to effect feeding movement of said quill in the one or the other direction selectively, control means mounted on said rail and operatively connected to effect adjustment of the rate at which said single shaft is driven by said driving means in said base, movably operable means arranged to actuate said rate control means, and means associated with said control drum and operative to actuate said rate control means.

4. In a machine tool of the rail type, a base, a work supporting table slidably mounted on said base, a spindle supporting rail carried by said base above said table, power driving mechanism mounted in said base, a feed rate selecting mechanism mounted in said base and operatively connected to be driven by said power driving mechanism, means operatively connecting said feed rate mechanism to drive said table at selected rate, means operatively connecting said feed rate mechanism to actuate said rail at the same selected feed rate, rapid traverse driving means including a clutch arranged to connect said power driving mechanism to said table for driving it at rapid traverse rate, and a second rapid traverse driving means including another clutch operative to transmit rapid traverse driving power to said rail selectively at a rate different from that at which said table is driven.

5. In a machine tool of the rail type, a base, a work supporting table slidably mounted on said base, a spindle supporting rail carried by said base above said table, a feed rate selecting mechanism mounted in said base, means operatively connecting said feed rate mechanism to drive said table at a selected rate, means operatively connecting said feed rate mechanism to actuate said rail at the same selected feed rate, rapid traverse driving means for driving said table at rapid traverse rate, and a second rapid traverse driving means operative to transmit rapid traverse driving power to said rail selectively at a rate different from that at which said table is driven.

6. In a machine tool having a base, a work supporting element movably mounted on said base, a tool supporting element movably mounted in cooperating relationship with said work supporting element, power driven means in said base for actuating said elements, a transmission mechanism arranged to effect movement of said elements at selected feed rate, a transmission mechanism selectively engageable to effect movement of said work supporting element at rapid traverse rate, and an independent transmission mechanism selectively engageable to effect movement of said tool supporting element at rapid traverse rate, whereby said work supporting element and said tool supporting element may be driven at different rapid traverse rates.

7. In a machine tool having a base, a cutter supporting rail disposed in horizontal position above said base and presenting a longitudinal slot, a spindle head slidably mounted on said rail, a spindle quill slidably mounted in said head at one side of said rail, a cutter carrying spindle rotatably mounted in said quill, a driving motor mounted on said head at the other side of said rail in position to counterbalance said spindle and quill, and power transmission mechanism carried by said head and operatively connected to transmit power from said driving motor through said slot in said rail to said cutter carrying spindle.

8. In a machine tool including a base, a horizontally disposed cutter carrying rail supported by said base, a spindle head slidably mounted on one side of said rail for horizontal adjustment therealong, a cutter driving spindle carried by said head, a spindle driving motor mounted on the other side of said rail for adjustment therealong with said spindle head, transmission means operatively connecting said motor to said spindle to drive it, and mounting means connecting said motor to said head both above and below said rail, said motor being positioned to counterbalance said spindle head for facilitating its adjustment along said rail.

9. In a machine tool, a base, a cutter supporting rail carried by said base, a cutter carrying head slidably mounted on one side of said rail for movement therealong, a cutter carrying spindle rotatably mounted in said head, a driving motor operatively connected to actuate said cutter spindle, and means securing said motor to said head both above and below said rail in position to extend therefrom at the opposite side of said rail from said head, whereby the weight of said motor serves to counterbalance the weight of said cutter head to facilitate its movement along said rail.

10. In a machine tool, a horizontally disposed spindle carrying rail provided with a slot along its neutral axis, a spindle head slidably mounted on said rail for adjustment horizontally therealong, a spindle carried by said head at one side of said rail, a spindle driving motor carried by said head at the other side of said rail in manner to balance said spindle, and power transmitting mechanism extending from said motor through said slot in said rail to said spindle for driving it.

11. In a machine tool including a base, a cutter supporting rail disposed horizontally above said base said rail being provided with a longitudinally disposed slot, a spindle head slidably mounted on said rail for horizontal adjustment therealong, a cutter carrying spindle and transmission mechanism therefor supported by said spindle head at one side of said rail, a driving motor supported by said spindle head at the other side of said rail in position to counterbalance said spindle mechanism, and a power transmitting shaft extending from said motor through said slot in said rail and connected to said transmission mechanism to drive said cutter spindle.

12. In a machine tool including a base and cooperating uprights, a spindle supporting rail carried by said uprights for vertical movement therealong, a spindle head slidably mounted on said rail for horizontal feeding movement, power operated transmission mechanism arranged to move said spindle head along said rail, a control drum rotatably mounted on one end of said rail for movement bodily therewith, means operatively connecting said transmission mechanism to said control drum for actuating it in synchronism with movement of said head, and trip mechanism associated with said control drum and operative to control said transmission mechanism in manner to govern the rate and direction of movement of said spindle head along said rail.

13. In a machine tool, a base, a working member movably mounted on said base, power transmission mechanism carried by said base and operatively arranged to effect movement of said member in either direction at either of two rates, a control lever arranged to be moved to either of two positions in one plane to change the rate of movement and to either of two positions in another plane to change the direction of movement of said member, a tripping post disposed to be actuated by said working member in its course of movement and operative upon said power transmission mechanism to regulate movement of said member, and control means associated with said control lever and operative upon movement thereof to a predetermined third position in the plane of said rate controlling movement to withdraw said tripping post from the path of movement of said working member, whereby said working member may be controlled by said control lever to effect movement in either direction without interference from said tripping post.

14. In a machine tool actuating mechanism, the combination with a base and a working member movably mounted on said base, of control mechanism for said working member including a tripping post, trip dogs on said working member arranged to cooperate with said tripping post to effect control of said member in response to its movements, a manually operable control lever arranged to effect control of said member selectively, and interconnecting means operatively connected with said control lever and actuable thereby when it is moved to a predetermined position to effect movement of said tripping post out of the path of movement of said trip dogs selectively, whereby said tripping post may be withdrawn after actuation by a trip dog to permit independent control of said working member by said lever.

15. In a machine tool, a base, a working member mounted on said base for movement relative thereto, power actuated means operative to effect movement of said working member relative to said base, control means for said power means including a tripping post operative to control the rate and direction of movement of said working member, trip dogs adjustably mounted on said working member in position to cooperate with said tripping post in the course of movement of said member, an independent manually actuated control lever operative upon said control means to control the rate and direction of movement, and means operatively connected with said lever and operative when it is moved to a predetermined position to withdraw said tripping post from the path of said trip dogs, whereby said manual control lever may be rendered effective regardless of the action of a trip dog on said tripping post.

16. In a machine tool of the rail type, a base, a horizontally disposed rail mounted for vertical movement relative to said base, power operated means in said base, a single power transmitting shaft extending from said base to said rail, transmission means connected to drive said shaft from said power operated means at a selected rate, a hydraulic control system operative to effect selection of the rate at which said single shaft is driven, and control means mounted on said rail for bodily movement therewith and operatively connected to actuate said hydraulic control system to select the rate for driving said single shaft.

17. In a machine tool of the rail type, a base, a horizontally disposed rail mounted for vertical movement relative to said base, a single power transmitting shaft extending from said base to said rail, transmission means in said base connected to drive said shaft at selected rates, a control system operative to effect selection of the rate at which said single shaft is driven by said transmission means in said base, and control means mounted on said rail in manner to be bodily movable therewith and operatively connected to actuate said control system in selecting the rate for driving said single shaft.

18. In a machine tool of the rail type, a base, power driving mechanism including selectively operative rapid traverse driving means and a source of fluid pressure mounted in said base, a tool carrying rail movably mounted above said base, means to transmit power from said base to said rail, fluid pressure operated control mechanism carried by said rail, conduit means arranged to transmit fluid pressure from said source in said base to said control mechanism on said movable rail, and conduit means arranged to connect said control mechanism on said movable rail with said selectively operative rapid traverse driving means in said base for actuating it, whereby the rate of operation of mechanism on said movable rail may be controlled by control mechanism carried by said rail.

19. In a machine tool, a frame, a member movably mounted on said frame, a clamping arrangement operative to clamp said member to said frame at a plurality of spaced positions, a threaded shaft arranged to effect a clamping action at one of said positions, a spring pressed clamp arranged to effect a clamping action at another of said positions, and cam means associated with said threaded shaft and operative when said shaft is turned to unclamped position to oppose said spring pressed clamp and move it also to unclamped position.

20. In a clamping arrangement for a machine tool, a plurality of clamping elements arranged at spaced positions, spring means operative to urge one of said elements to clamped position, manually operable means arranged to actuate another of said clamping elements to clamped or unclamped position selectively, means associated with said manually operable clamping means and operative when it is moved to unclamped position to oppose said spring means and move said first clamping element to unclamped position, and an adjustable connection between said manually operable means and its associated clamping element for adjusting their relationship to provide for synchronizing the operation of said clamping elements.

21. In a machine tool having a base, a spindle supporting structure mounted for movement relative to said base, power operated means mounted in said base, a single power transmitting shaft extending from said base to said spindle supporting structure, transmission mechanism arranged to transmit power to said single shaft from said power operated means at selected rate, hydraulic control apparatus operative to select the rate at which said transmission mechanism drives said shaft, and control means mounted on said spindle supporting structure for bodily movement with it and operatively connected to actuate said hydraulic control system in manner to effect selection of the rate at which said shaft is driven by said power operated means in said base.

22. In a machine tool, a frame, a supporting structure movably mounted on said frame, means to clamp said supporting structure to said frame at a plurality of positions, force exerting means operative continuously to urge one of said clamping means to clamped position, actuating means arranged to operate upon another of said clamping means to move it to clamped position, and means associated with said actuating means and operative when it is moved to unclamped position to oppose said force exerting means in manner to move said first clamping means to unclamped position also.

23. In a machine tool, a frame, an element movably mounted on said frame, a clamping member arranged to clamp said element to said frame, said member presenting a series of serrations, and an operating member for said clamping member, said operating member presenting complementary serrations for receiving the serrations of said clamping member, the arrangement being such that relative adjustment may be effected between said operating member and said clamping member to regulate the clamping action.

24. In a machine tool having a base, a work supporting element movably mounted on said base, a tool supporting element movably mounted in cooperating relationship with said work supporting element, a transmission mechanism arranged to effect movement of said elements at selected feed rate, a transmission mechanism selectively engageable to effect movement of said work supporting element at a selected rapid traverse rate, and an independent transmission mechanism selectively engageable to effect movement of said tool supporting element at a different rapid traverse rate.

25. In a machine tool, a frame, a member movably mounted on said frame, a clamping element arranged to engage said frame to clamp said member in selected position, a threaded actuating element for exerting force on said clamping element, means on said clamping element presenting a series of closely spaced serrations, and a nut presenting serrations complementary to the serrations of said clamping element and adapted to engage said element at any of a plurality of angularly related positions, said nut being arranged to cooperate with said threaded actuating element to exert clamping force and being adjustable angularly through changing the engagement of said serrations to adjust the clamping action.

26. In a machine tool having a base, a spindle supporting structure presenting a longitudinally disposed slot, a spindle head slidably mounted for movement along said structure, a spindle carried by said head at one side of said structure, a spindle driving motor carried by said head at the other side of said structure in position to balance said spindle, and a power transmission mechanism operatively connecting said motor to said spindle for driving it, said transmission mechanism including a shaft extending through said slot.

27. In a machine tool, a frame, a member movably mounted on said frame, a plurality of clamping elements operatively arranged to clamp said member to said frame, said clamping elements being provided with closely spaced serrations, an actuating element arranged to move said clamping elements simultaneously, and serrated connectors associated with said actuating element and operative to engage said serrated clamping elements in any of a plurality of positions, whereby the relationship between said actuating element and said clamping elements may be adjusted to equalize the clamping action.

JOSEPH B. ARMITAGE.
ORRIN W. BARKER.